(12) United States Patent
Hanabusa et al.

(10) Patent No.: US 10,305,330 B2
(45) Date of Patent: May 28, 2019

(54) POWER TRANSMISSION DEVICE

(71) Applicant: TDK CORPORATION, Tokyo (JP)

(72) Inventors: Kazuyoshi Hanabusa, Tokyo (JP); Masayuki Kobayashi, Tokyo (JP); Takeshi Kamono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 144 days.

(21) Appl. No.: 15/471,345

(22) Filed: Mar. 28, 2017

(65) Prior Publication Data
US 2017/0288464 A1    Oct. 5, 2017

(30) Foreign Application Priority Data
Mar. 30, 2016    (JP) .................. 2016-069123

(51) Int. Cl.
H01F 27/28    (2006.01)
H01F 27/34    (2006.01)
H01F 38/14    (2006.01)
H02J 50/12    (2016.01)
H02J 50/90    (2016.01)

(52) U.S. Cl.
CPC .......... H02J 50/12 (2016.02); H01F 27/2885 (2013.01); H01F 27/346 (2013.01); H01F 38/14 (2013.01); H02J 50/90 (2016.02); Y02T 10/7005 (2013.01)

(58) Field of Classification Search
USPC ........................................................ 307/104
See application file for complete search history.

(56) References Cited

U.S. PATENT DOCUMENTS

2010/0065352 A1*  3/2010  Ichikawa ............... B60L 11/182
                                                        180/65.8
2012/0104998 A1*  5/2012  Takada .................. B60L 11/182
                                                        320/108
2016/0144727 A1    5/2016  Tokura et al.

FOREIGN PATENT DOCUMENTS

| JP | 2010-172084 A  |   | 8/2010 |
| JP | 2010-183810 A  |   | 8/2010 |
| JP | 2011-049230 A  |   | 3/2011 |
| JP | 2015-065728 A  |   | 4/2015 |
| JP | WO2013/132616 A1 |   | 7/2015 |
| JP | 2016042593     | * | 3/2016 |
| WO | 2013/132616 A1 |   | 9/2013 |

* cited by examiner

Primary Examiner — Rexford N Barnie
Assistant Examiner — Xuan Ly
(74) Attorney, Agent, or Firm — Oliff PLC

(57) ABSTRACT

A power transmission device, which is used for a contactless power transmission to a movable body moving on a travelling surface in a power transmission direction parallel to the travelling surface, including a power transmission coil and a shielding plate, wherein, the power transmission coil is installed so that a coil surface is approximately vertical to the travelling surface, and at least a part of the shielding plate is disposed inside the region on the travelling surface sandwiched between a plane surface defined by a coil surface of the power transmission coil and a plane surface defined by a coil surface of a power receiving coil mounted on the movable body.

4 Claims, 3 Drawing Sheets

POWER TRANSMISSION DEVICE

The present invention relates to a power transmission device for transmitting power contactlessly. In particularly, it relates to a power transmission device provided with a countermeasure against the magnetic field leaked from the device.

BACKGROUND

Recently, contactless power transmission technology for transmitting power from a power feeding side to a power receiving side contactlessly is attracting attention. For example, in the power transmission by using magnetic field, the power is transmitted from the coil of the transmission side to the coil of the power receiving side via the magnetic field generated by the coil of the transmission side. A part of the magnetic field generated by the coil of the transmission side will be leaked during the power transmission by using magnetic field, and the leaked magnetic field will cause various problems.

As one of the problems, generation of an induced current caused by the leaked magnetic field can be listed. In Patent Document 1 and Patent Document 2, a problem is described that in the contactless power feeding device for supplying power to a movable body such as an electric vehicle or the like contactlessly, an induced current flows into an iron plate used in the floor of the vehicle body equipped with an power receiving part, and thus the iron plate generates heat. Moreover, it is disclosed that in order to prevent the induced current from generating, an aluminum plate is disposed on the back surface of the power receiving part. In addition, a problem also arises that the efficiency of the contactless power feeding device reduces due to the power loss caused by the induced current.

In the contactless power feeding device disclosed in Patent Document 1 and Patent Document 2, power is transmitted in a vertical direction from the power transmission part horizontally disposed on the ground to the power receiving part disposed under the floor of the vehicle body. Thus, a countermeasure against the leaked magnetic field in a supposed horizontal power transmission is not studied in Patent Document 1 and Patent Document 2. That is, the effect of the leaked magnetic field in a direction of the ground is not studied because it is supposed that the power is transmitted in a vertical direction.

PATENT DOCUMENT

Patent Document 1: JP-A-2010-172084
Patent Document 2: JP-A-2011-49230
Patent Document 3: JP-A-2010-183810

SUMMARY

However, with respect to the contactless power feeding device disclosed in Patent Document 3, as a primary coil and a secondary coil are vertically installed relative to the ground and power is horizontally transmitted, the magnetic field will also leak in the ground direction. Thus, a countermeasure is required not only on the back surface of the coil, but also for the magnetic field leaked in the ground direction. Specially, sometimes an iron material is used on the floor face in a contactless power feeding device used in the room. In such a case, an induced current flows in the iron material; and thus it is afraid that the iron material may produce heat and the power transmission efficiency may be decreased.

Thus, the present invention aims to decrease the influence of the magnetic field leaked in the ground or the floor direction in the contactless power feeding device for transmitting power in the horizontal direction in which the power transmission and receiving coils are vertically installed relative to the ground or the floor surface.

In order to solve the above mentioned problem, the power transmission device according to an embodiment of the present invention is a device for transmitting power contactlessly to a movable body moving on a travelling surface in the power transmission direction being parallel to the travelling surface. The power transmission device comprises a power transmission coil installed with the coil surface being approximately vertical to the travelling surface, and a shielding plate at least a part of which is disposed inside the region on the travelling surface sandwiched between the plane surface defined by the coil surface of the power transmission coil and the plane surface defined by the coil surface of the power receiving coil mounted in the movable body.

The loss during the power transmission from the power transmission coil to the power receiving coil can be decreased by disposing the shielding plate in such a manner.

In addition, the shielding plate in the power transmission device according to the embodiment of the present invention is preferably disposed to improve the power transmission efficiency from the power transmission coil to the power receiving coil. In this case, the loss during the power transmission from the power transmission coil to the power receiving coil can be effectively reduced.

In addition, the power transmission coil in the power transmission device according to the embodiment of the present invention can be installed in a manner that the installation height (i.e., the distance from the coil outer edge to the travelling surface) is shorter than the height of the coil outer shape in the direction approximately vertical to the travelling surface. In this case, the loss during the power transmission from the power transmission coil to the power receiving coil can also be effectively reduced.

Moreover, in the power transmission device according to the embodiment of the present invention, the length from the plane surface defined by the coil surface of the power transmission coil to the end portion of the power receiving coil side of the shielding plate is preferably set to be longer than the installation height.

In this way, the loss during the power transmission from the power transmission coil to the power receiving coil can be effectively reduced by disposing a shielding plate in the portion where the leaked magnetic field reaching the travelling surface is strong.

In addition, the power transmission device according to the embodiment of the present invention is preferably to be installed with the upper surface of the shielding plate being approximately in the same plane as the travelling surface.

With such an installation, no step will be generated in the travelling surface, therefore, a shielding plate can be installed without any bad influence on the travelling of the movable body.

The power transmission device according to an embodiment of the present invention is a device for contactlessly transmitting power in a horizontal direction. The power transmission device comprises a power transmission coil installed with the winding-axial direction is approximately parallel to the horizontal direction, and a shielding plate, wherein, the shielding plate has a main face extending in the horizontal direction, and at least a part of the shielding plate is disposed inside the region located at the vertical lower part of the space sandwiched between the plane surface defined by the coil surface of the power transmission coil and the plane surface defined by the coil surface of the power receiving coil opposite to the power transmission coil.

The loss during the power transmission from the power transmission coil to the power receiving coil can be reduced by disposing the shielding plate in such a manner.

According to some embodiments of the present invention, the loss caused by the leaked magnetic field can be reduced and the power transmission efficiency from the power transmission coil to the power receiving coil can be improved by disposing the shielding plate on the travelling surface.

DETAILED DESCRIPTION OF EMBODIMENTS

Figure 1:
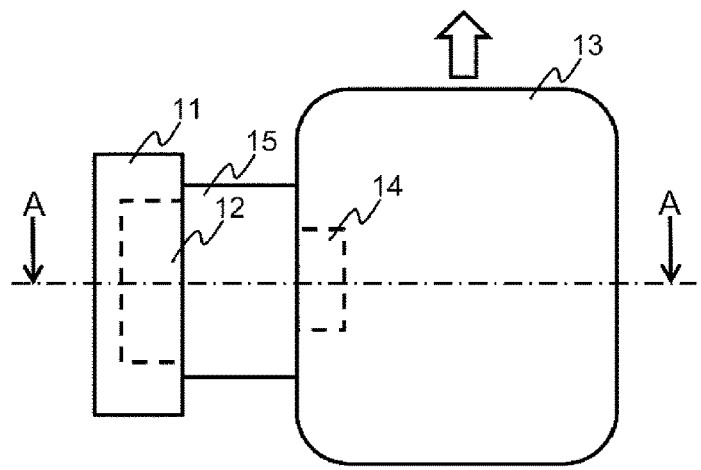
FIG. 1 is a schematic view for illustrating the contactless power feeding system of the present invention.

The embodiments for carrying out the present invention will be described in detail with reference to the drawings. However, the present invention is not limited by the description in the following embodiments. In addition, the same symbols or reference numerals will be attached to the same elements or the elements having the same functions, and repeated description will be omitted.

Figure 2:
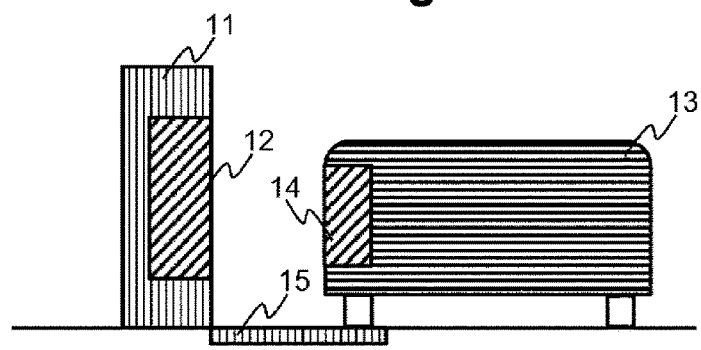
FIG. 2 is a cross section view for illustrating the contactless power feeding system of the present invention.

FIG. 1 and FIG. 2 are a schematic view and a cross section view for showing the power transmission to a movable body which incorporates the contactless power feeding device of the present embodiment. FIG. 1 shows a case when movable body 13 is observed from the upper side wherein power receiving coil 14 of the contactless power feeding device is mounted in movable body 13. FIG. 2 shows an A-A cross-section in FIG. 1. As shown in there figures, power transmission coil 12 is incorporated in power transmission device 11 of the contactless power feeding device. When electric power is transmitted from power transmission coil 12 to power receiving coil 14, power transmission coil 12 and power receiving coil 14 can be magnetically coupled. However, not all of the magnetic field generated by power transmission coil 12 is interlinked with power receiving coil 14, and a part of the magnetic field is leaked. In order to prevent an induced current (an eddy current) caused by the magnetic field from flowing into the iron material or the like installed on the floor side or the ground side, a non-magnetic conductive plate (hereinafter also referred to as a shielding plate) is placed on the floor surface or the ground surface (hereinafter also referred to as a travelling surface). As the shielding plate, for example, an aluminum plate, a copper plate, an alloy plate containing aluminum or copper, a conductive carbon material or the like can be used. In the present embodiment, shielding plate 15 is installed on the travelling surface between power transmission coil 12 and power receiving coil 14. That is, at least a part of shielding plate 15 is disposed inside the region on the travelling surface sandwiched between the plane surface defined by the coil surface of power transmission coil 12 and the plane surface defined by the coil surface of power receiving coil 14 mounted on the movable body. As no step is generated between the place covered by shielding plate 15 and the place without shielding plate 15, shielding plate 15 is preferred to be disposed inside the depressed portion formed on the travelling surface. In this case, the upper surface of shielding plate 15 will be approximately in the same plane as the travelling surface. In addition, the shielding plate 15 is preferably electrically connected with the frame ground of the power transmission device.

Figure 3:
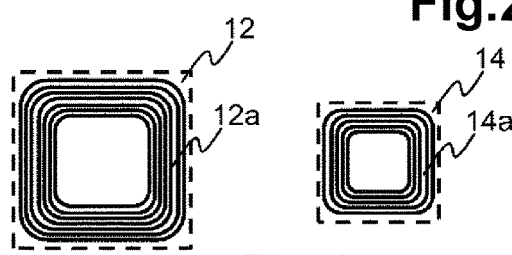
FIG. 3 is a schematic view for illustrating the power transmission coil and the receiving power coil.

FIG. 3 is a schematic view showing an example of power transmission coil 12 and power receiving coil 14. In this example, power transmission coil 12 includes winding wire 12a wound into a spiral shape, and power receiving coil 14 includes winding wire 14a wound into a spiral shape. The central axis of winding wire 12a is approximately vertical to the opposite surface of power transmission coil 12 (the surface opposite to power receiving coil 14). Similarly, the central axis of winding wire 14a is approximately vertical to the opposite surface of power receiving coil 14 (the surface opposite to power transmission coil 12). In addition, power transmission coil 12 is installed so that the central axis of winding wire 12a becomes approximately horizontal. Similarly, power receiving coil 14 is installed so that the central axis of winding wire 14a becomes approximately horizontal. Therefore, during the power transmission from power transmission coil 12 to power receiving coil 14, the power can be transmitted in the horizontal direction.

Figure 4:
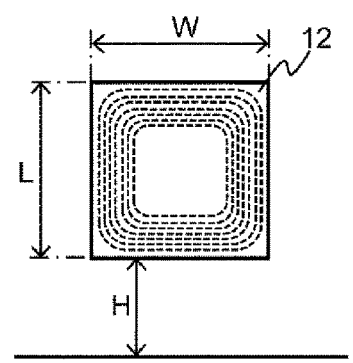
FIG. 4 is an explanatory view for illustrating the disposition of the power transmission coil and the power receiving coil.

Next, the installation state of power transmission coil 12 with shielding plate 15 having a more significant effect is described with reference to FIG. 4. FIG. 4 shows the case when observing power transmission coil 12 from the opposite surface side. Herein, L represents the length of power transmission coil 12 in the lengthwise direction (vertical direction), and W represents the length of power transmission coil 12 in the widthwise direction (horizontal direction). H represents the distance from power transmission coil 12 to the travelling surface. That is, L is the length of the coil outer shape of power transmission coil 12 in the direction approximately vertical to the travelling surface of the movable body, and H is the installation height, i.e., the distance from the coil outer edge of power transmission coil 12 to the travelling surface of the movable body. Herein, when the length L of power transmission coil 12 in the lengthwise direction (vertical direction) is larger, the strength of the leaked magnetic field reaching the travelling surface will become stronger. In addition, the strength of the leaked magnetic field reaching the travelling surface will become weaker when the distance H is larger. Therefore, when the relative value of the distance H is small on the basis of the length L of power transmission coil 12 in the lengthwise direction (vertical direction), the effect of shielding plate 15 will be more significant. That is, when the distance H is shorter than the length L of power transmission coil 12 in the lengthwise direction (vertical direction) (i.e., H<L), the effect of shielding plate 15 will be more significant.

With respect to the effect difference produced by the size of shielding plate 15, the effect will become larger if the size is bigger while the effect will become smaller if the size is smaller. For example, when focusing attention on the efficiency of the contactless power feeding device, the efficiency will be enhanced if the size of shielding plate 15 is larger while the efficiency will be reduced if the size is smaller. Therefore, for example, the length of shielding plate 15 in the direction parallel to the side in the widthwise direction (horizontal direction) of power transmission coil 12 is preferably at least the same as the length W of power transmission coil 12 in the widthwise direction (horizontal direction). Moreover, the length of shielding plate 15 in the power transmission direction is preferably a length enough to cover the travelling surface between the power transmission surface (the coil surface vertical to the power transmission direction) of power transmission coil 12 and the power receiving surface (the surface vertical to the power transmission direction) of power receiving coil 14 by shielding plate 15. That is, it is preferable that the length of shielding plate 15 in the power transmission direction is equal to or longer than the length from the power transmission surface of power transmission coil 12 (i.e., the coil surface of the power transmission coil) to the power receiving surface of power receiving coil 14 (i.e., the coil surface of the power receiving coil). In addition, when the length from the power transmission surface of power transmission coil 12 to the power receiving surface of power receiving coil 14 changes, the maximum value of the length preferably satisfies this condition. Moreover, when power transmission coil 12 and power receiving coil 14 are stored in a housing, the power transmission surface becomes a plane surface (i.e., the plane surface of power receiving coil 14 side of the winding wire wound in a plane shape) formed by winding wire 12a of power transmission coil 12, and the power receiving surface becomes a plane surface (i.e., the plane surface of power transmission 12 side of the winding wire wound in a plane shape) formed by winding wire 14a of power receiving coil 14.

Figure 5A:
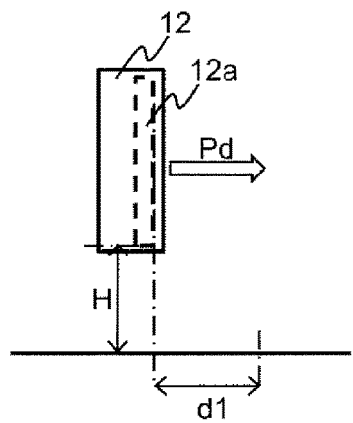
FIG. 5a is an explanatory view for illustrating the position where the shielding plate is installed.
Figure 5B:
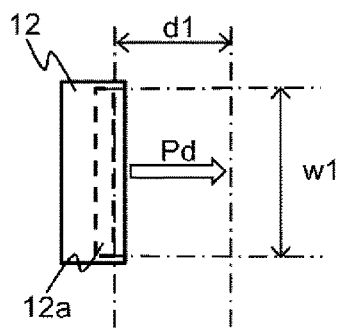
FIG. 5b is an explanatory view for illustrating the position where the shielding plate is installed.

Next, the range where the strength of the leaked magnetic field reaching the travelling surface is strong is described with reference to FIG. 5. FIG. 5a shows the case when power transmission coil 12 is observed in a direction parallel to the travelling surface and vertical to the power transmission direction Pd, and FIG. 5b shows the case when power transmission coil 12 is observed from the direction vertical to the travelling surface. In these figures, the power transmission surface defined by winding wire 12a of power transmission coil 12 is set to be approximately vertical to the travelling surface, and the power transmission direction Pd becomes approximately parallel to the travelling surface. Winding wire 12a of power transmission coil 12 is disposed at a position with a height H away from the travelling surface. Herein, the distance in the direction from the power transmission surface of power transmission coil 12 to the power transmission direction Pd is set as d1, and the width in the direction vertical to the power transmission direction Pd is set as w1. With such a definition, the strength of the leaked magnetic field reaching the travelling surface becomes relatively stronger in the area where the width w1 is approximately equal to the width of winding wire 12a of power transmission coil 12 and the value of the distance d1 is smaller than that of the height H. Hence, if the shielding plate is installed in such an area, the power transmission efficiency from the power transmission coil to the power receiving coil can be improved. In addition, the length from the plane surface defined by the coil surface of power transmission coil 12 to the end portion of power receiving coil 14 side of shielding plate 15 is preferably set to be longer than installation height H.

As described above, the example in which the contactless power feeding device is applied to a movable body has been described in the present embodiment, but it is not limited thereto. It can be applied to various products as long as it performs power transmission in a horizontal direction. Examples of the applicable products include home electric appliances, portable electronic equipments, toys, and the like. The above effect can also be obtained even when these productions are installed or disposed to be opposite to the power transmission device to perform the power feeding. That is, the above effect also can be obtained even in the following case, i.e., in a contactless power feeding device for contactlessly transmitting power between the power transmission coil and the power receiving coil which are installed or disposed with a winding axis direction approximately parallel to the horizontal direction, a shielding plate having a main face extending along the horizontal direction is disposed in a region located in a vertical lower part of a space sandwiched between a plane surface defined by the coil surface of the power transmission coil and a plane surface defined by the coil surface of the power receiving coil opposite to the power transmission coil.

Next, a drive circuit for supplying an alternating current to power transmission coil 12 and a power receiving circuit for supplying the power received from power receiving coil 14 to an electricity storage device such as a battery are described with reference to FIG. 6. Herein, the drive circuit is a circuit mounted in the device of the power transmission side, and the power receiving circuit is a circuit mounted in the device of the power receiving side. The drive circuit is constructed by switching elements SW1 to SW4. Switching element SW1 and switching element SW2 are connected in series, and a DC input voltage Vin is applied to two ends of them. Similarly, switching element SW3 and switching element SW4 are connected in series, and an input voltage Vin is applied to two ends of them. One end of power transmission coil Lt (corresponding to power transmission coil 12) is connected with one end of capacitor Ct, the other end of power transmission coil Lt is connected with the connection point of switching element SW3 and switching element SW4, and the other end of capacitor Ct is connected with the connection point of switching element SW1 and switching element SW2. The current Idr flowing into power transmission coil Lt is controlled by ON and OFF of switching elements SW1~4.

The power receiving circuit is constructed by bridge diode Dr and capacitor Co. One end of power receiving coil Lr (corresponding to power receiving coil 14) is connected with one end of capacitor Cr, the other end of power receiving coil Lr is connected with one input terminal of bridge diode Dr, and the other end of capacitor Cr is connected with the other input terminal of bridge diode Dr. Capacitor Co is connected between the output terminals of bridge diode Dr. The current flowing into power receiving coil Lr is full-wave rectified by bridge diode Dr and then supplied to capacitor Co. In addition, the back part of capacitor Co is connected with the electricity storage device such as a battery through a DCDC converter or the like.

Figure 6:
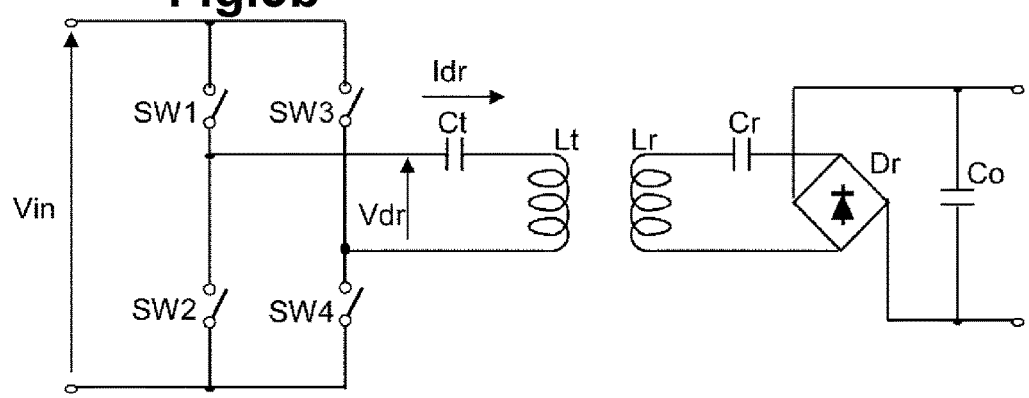
FIG. 6 is a schematic circuit diagram showing the power transmission coil, the power receiving coil and their peripheral circuit.

In addition, the drive circuit and the power receiving circuit also can be constructed by another circuit beside the circuit shown in FIG. 6. For example, a half bridge structure can be used in the drive circuit. Moreover, a circuit for improving power factor between the front part of the drive circuit or the drive circuit and the power transmission coil or a circuit for adjusting the impedance also can be added.

Figure 7:
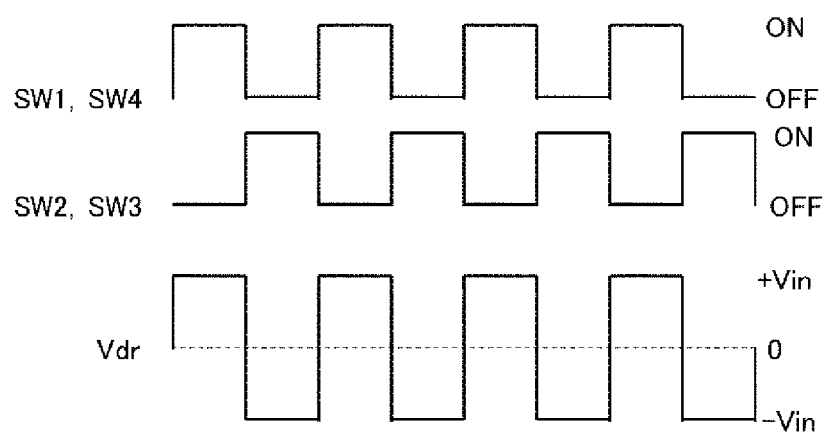
FIG. 7 is a wave form chart for showing the voltage applied to the power transmission coil.

Next, the switching operations of switching elements SW1 to SW4 are described with reference to FIG. 7. In the example shown in FIG. 7, switching element SW1 and switching element SW4 turn on and off at the same time. Similarly, switching element SW2 and switching element SW3 turn on and off at the same time, too. The voltage Vdr (the voltage is based on the connection point side of switching element SW3 and switching element SW4) between the connection point (of switching element SW1 and switching element SW2) and the connection point (of switching element SW3 and switching element SW4) makes a change based on the on/off states of switching elements SW1 to SW4. As shown in FIG. 7, when switching element SW1 and switching element SW4 turn on and switching element SW2 and switching element SW3 turn off, the absolute value of the voltage Vdr becomes a positive voltage value which is approximately equal to the input voltage Vin. On the other hand, when switching element SW1 and switching element SW4 turn off and switching element SW2 and switching element SW3 turn on, the absolute value of the voltage Vdr becomes a negative voltage value which is approximately equal to the input voltage Vin.

In the example shown in FIG. 6, the resonance frequency of the resonance circuit constructed by power transmission coil Lt and capacitor Ct is set to be approximately the same as that of the resonance circuit constructed by power receiving coil Lr and capacitor Cr. For example, the frequency can be set as about 10 kHz to 200 kHz. Besides, switching elements SW1 to SW4 in the drive circuit can be turned on and off by the frequency close to the resonance frequency.

Hereinbefore, the embodiment of the contactless power feeding system according to the present invention has been described, but the present invention is not limited to the embodiment described above, and various modifications can be added in the range without departing from the scope of the invention. In addition, with respect to the power transmission coil constituting the contactless power feeding device, the drive circuit as well as the construction, structure and controlling method of the control device, various circuit construction, structure and control method which the skilled in the art can easily think of can be adopted. For example, as the power transmission coil, a coil with a spiral shape or a solenoid shape, a coil combined by coils having a spiral shape and a solenoid shape, and a coil combined by a coil with another shape and a capacitor can be used.

DESCRIPTION OF REFERENCE NUMERALS 11 power transmission device
12 power transmission coil
13 movable body
14 power receiving coil
15 shielding plate

What is claimed is:

1. A power transmission device, which is used for a contactless power transmission to a movable body moving on a travelling surface in a power transmission direction parallel to the travelling surface, comprising a power transmission coil and a shielding plate, wherein,
    the power transmission coil is installed so that a coil surface is approximately vertical to the travelling surface,
    at least a part of the shielding plate is disposed inside the region on the travelling surface sandwiched between a plane surface defined by a coil surface of the power transmission coil and a plane surface defined by a coil surface of a power receiving coil mounted on the movable body,
    the power transmission coil is disposed so that an installation height that is a distance from a coil outer edge to the travelling surface is shorter than a length of the coil outer shape in a direction approximately vertical to the travelling surface, and
    a length from the plane surface defined by the coil surface of the power transmission coil to an end portion of the power receiving coil side of the shielding plate is set to be longer than the installation height.

2. The power transmission device of claim 1, wherein, the shielding plate is disposed to improve the power transmission efficiency from the power transmission coil to the power receiving coil.

3. The power transmission device of claim 1, wherein, an upper surface of the shielding plate is disposed to be approximately in the same plane as the travelling surface.

4. The power transmission device of claim 2, wherein, an upper surface of the shielding plate is disposed to be approximately in the same plane as the travelling surface.

* * * * *